(12) United States Patent
King

(10) Patent No.: US 8,842,717 B2
(45) Date of Patent: Sep. 23, 2014

(54) METHOD AND APPARATUS FOR RAPID ACQUISITIONS OF GPS SIGNALS IN SPACE APPLICATIONS

(75) Inventor: Thomas Michael King, Tempe, AZ (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 26 days.

(21) Appl. No.: 13/437,602

(22) Filed: Apr. 2, 2012

(65) Prior Publication Data

US 2012/0250733 A1 Oct. 4, 2012

Related U.S. Application Data

(60) Provisional application No. 61/470,329, filed on Mar. 31, 2011.

(51) Int. Cl.
*H04B 1/00* (2006.01)
*H04B 1/7077* (2011.01)

(52) U.S. Cl.
CPC .... *H04B 1/7077* (2013.01); *H04B 2201/70715* (2013.01)

USPC ................. 375/150; 342/357.24; 342/357.25; 342/357.42; 342/357.51; 455/3.02

(58) Field of Classification Search
None
See application file for complete search history.

(56) References Cited

U.S. PATENT DOCUMENTS

| | | | |
|---|---|---|---|
| 4,426,712 A | 1/1984 | Gorski-Popiel | |
| 6,289,041 B1 | 9/2001 | Krasner et al. | |
| 6,775,319 B2 | 8/2004 | King et al. | |
| 7,548,199 B2 | 6/2009 | Winternitz et al. | |
| 2010/0117899 A1* | 5/2010 | Papadimitratos et al. | 342/357.12 |
| 2011/0316741 A1* | 12/2011 | Chansarkar et al. | 342/357.74 |

* cited by examiner

*Primary Examiner* — Adolf Dsouza
(74) *Attorney, Agent, or Firm* — Ingrassia, Fisher & Lorenz, P.C.

(57) ABSTRACT

A global positioning system (GPS) receiver that is configured to rapidly acquire GPS signals in space applications and a method for rapidly acquiring GPS signals in space applications is disclosed. In an embodiment, the GPS receiver includes, but is not limited to, a GPS signal acquisition component. The GPS signal acquisition component is adapted to acquire a GPS signal by receiving data from the GPS signal and processing the data to detect the GPS signal.

23 Claims, 13 Drawing Sheets

US 8,842,717 B2

METHOD AND APPARATUS FOR RAPID ACQUISITIONS OF GPS SIGNALS IN SPACE APPLICATIONS

TECHNICAL FIELD

The present invention generally relates to the Global Positioning System (GPS) and more particularly relates to rapid acquisition of GPS signals in space applications.

BACKGROUND

The strength of GPS satellite signals are 15-30 dB weaker when received from geosynchronous orbit (GEO) altitudes than when viewed from low earth orbit (LEO) altitudes or from the surface of the Earth. It is well known that the time it takes to detect a spread spectrum signal is inversely proportional to the received signal power. The use of a GPS receiver on satellites at GEO altitudes is becoming main-stream. The GPS information is used to determine precise time, position, and velocity for a variety of commercial and government satellites. Traditional multi-channel receivers acquire GPS satellite signals by searching the two-dimensional code-phase and Doppler uncertainty region sequentially. At LEO altitudes, it may take such multi-channel receivers over 30 minutes to acquire GPS satellites. At GEO altitudes, the acquisition of GPS satellite signals can take hours when using traditional GPS receiver architectures due to the significantly weaker strength of the GPS satellite signals, the greatly increased search time to trigger detection, and the small number of correlators (i.e., channels) used to execute the search. Such traditional multi-channel receivers have only 12 correlators (channels) to conduct such a search.

Others have attempted to address this issue. For example, U.S. Pat. No. 7,548,199 discloses a frequency domain search function for space GPS applications. U.S. Pat. No. 6,775,319 (the '319 patent) discloses a time-domain search and tracking processor that searches different Doppler space for each satellite. The '319 patent segments the code phase into unequal segment lengths and processes each segment completely before collecting the next segment. U.S. Pat. No. 6,289,041 discloses a second series of weighted coefficients corresponding to a carrier frequency sequence for each channel. Finally, U.S. Pat. No. 4,426,712 discloses a variable frequency shifting means for shifting the frequency of stored code sequences.

As prior art systems and methods take a significant amount of time to acquire GPS satellite systems at GEO altitudes, it is desirable to provide a system and a method that could permit a more rapid acquisition of GPS satellite signals from platforms located in GEO than is possible using prior art systems and methods. Additionally, it would be desirable to provide a system and method that could permit the acquisition of GPS satellite signals from platforms located in geosynchronous orbit in approximately five minutes or less. Furthermore, other desirable features and characteristics will become apparent from the subsequent detailed description and the appended claims, taken in conjunction with the accompanying drawings and the foregoing technical field and background.

BRIEF SUMMARY

One aspect of the invention provides a global positioning system (GPS) signal acquisition processor for use with a GPS receiver. The processor includes a Doppler removal and resampler module for receiving in-phase and quadrature data from a digital down converter, removing Doppler errors from the data, and resampling the data. The processor further includes a coherent integration module in communication with the Doppler removal and resample module for receiving the data and determining a plurality of coherent sums of the resampled in-phase and quadrature data. The coherent integration module also for scaling a number of bits of the plurality of coherent sums of the resampled in-phase and quadrature data to a lessor number of bits of a plurality coherent sums. The processor further includes a time domain correlation module to receive the lessor number of bits of a plurality of coherent sums and a plurality of bits from a spreading code memory and producing a plurality of coherent correlation sums, each coherent correlation sum corresponding to a particular code phase delay. The processor also includes a non-coherent integration module in communication with the time domain correlation module for receiving the plurality of coherent correlation sums from the time domain correlation module, producing a plurality of magnitude-squared quantities, and summing the plurality of magnitude squared quantities non-coherently to produce non-coherent summed data.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 2A:
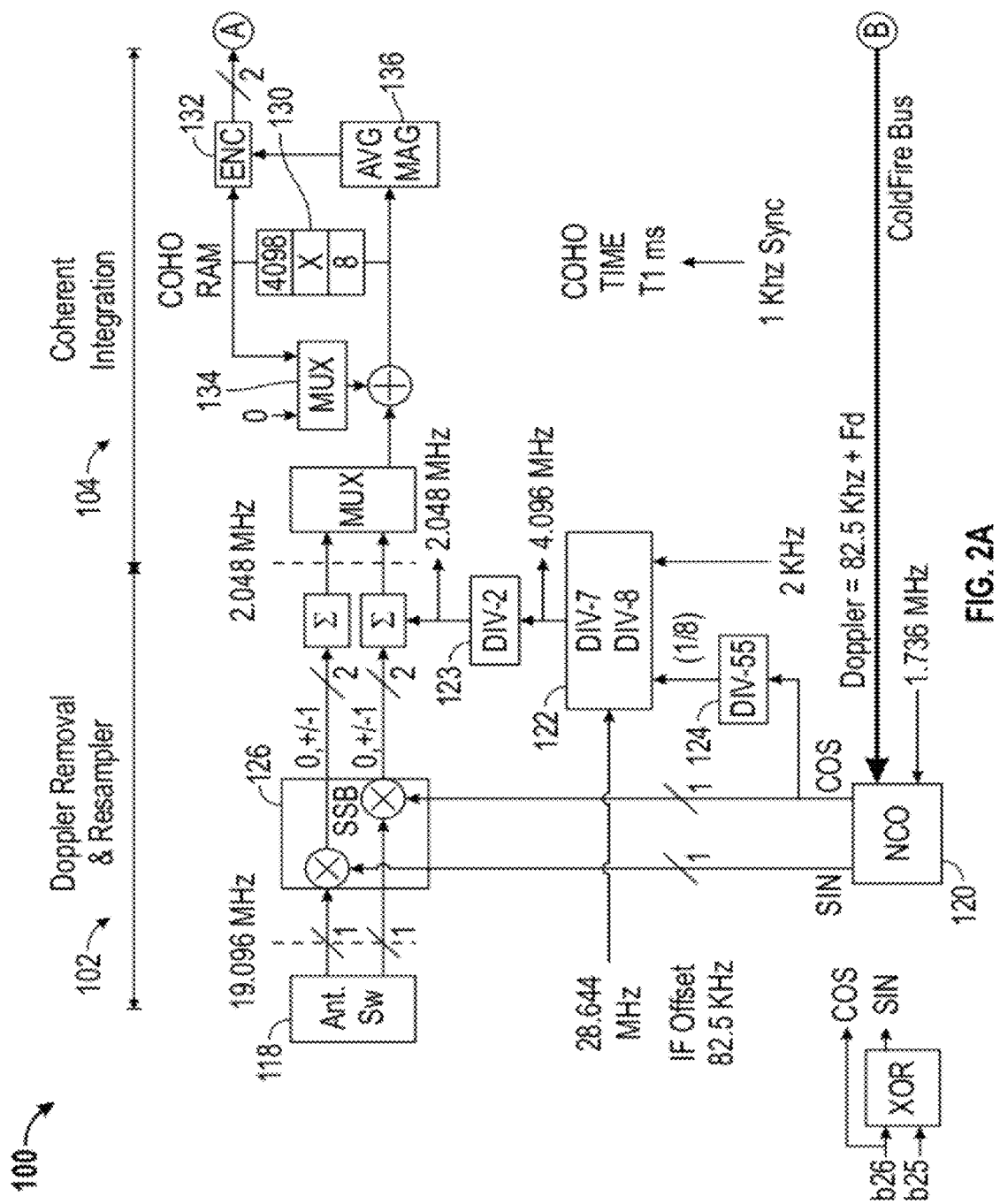
FIGS. 2A and 2B are a block diagram illustrating the acquisition processor.
Figure 2B:
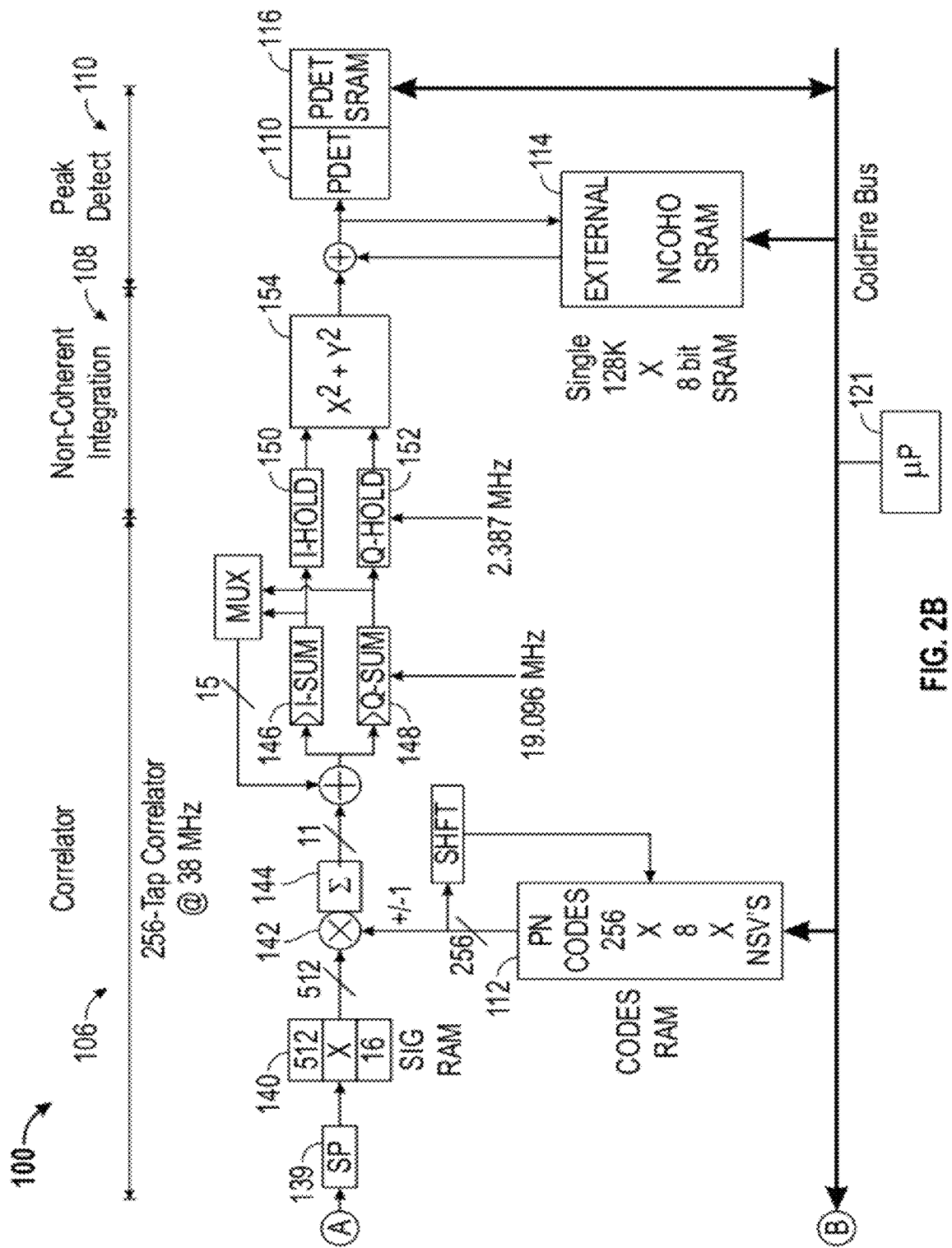

A GPS acquisition processor 100, as disclosed herein, and with an exemplary embodiment shown in FIGS. 2A and 2B, enables fast acquisition of weak GPS signals (or any other spread-spectrum signal), including, but not limited to circumstances where the platform is located at geosynchronous Earth orbit ("GEO") altitudes. The processor 100 utilizes a faster-than-real-time multi-tap correlator architecture that can step through the code-phase and Doppler domain for all satellites simultaneously, as described in greater detail below. This architecture decreases the search time by increasing the number of Doppler and code phase bins tested simultaneously. The diminution in search time will correspond with the amount of random access memory ("RAM") that is available and with the clock-rate on the faster-than-real-time processor. In one example, the GPS acquisition processor 100 may perform as if it had 32,768 individual correlators that can be assigned to search any satellite, any code phase delay, at a single programmable Doppler, simultaneously. Once the GPS satellites are detected, they are assigned to traditional GPS channels for tracking. Use of the GPS acquisition processor 100 may then be discontinued.

With respect to low Earth orbit ("LEO") altitudes, even though the signals are stronger at LEO than at GEO, the number of search bins to search from a cold-start is still enormous. The acquisition processor 100 disclosed herein can reduce that search time at LEO altitudes from 30 minutes down to about one minute. Similarly, the search time on a GEO platform is several hours using prior art methods; the acquisition processor 100 described herein lowers the search time to less than five minutes.

Several improvements over the systems and methods currently in use are possible by utilizing the systems and methods disclosed herein. For example, from a cold-start, acquisition of GPS signals at GEO altitudes can be achieved within approximately five minutes. In another example, cold start acquisitions of GPS signals at LEO altitudes can be achieved within approximately one minute. In another example, the systems and methods disclosed herein can search for and find unknown strong GPS satellites that may cause cross-correlation interference with those weak GPS satellites already being tracked. As used herein, the term "cold start" is defined as sky searching for satellites without the need for initial time, position, velocity of the host platform or without the use of the GPS Satellite Almanac (i.e., Keplerian orbit parameters for the GPS satellites).

These improvements can be achieved through the use of several techniques. In one example, the dedicated time-domain acquisition processor 100 will systematically search for, and identify visible GPS satellites, their Doppler frequency, and their code phase. The satellite search order is optimized for GEO satellite environments, searching the portion of the satellite Doppler space where GPS satellites are more likely to be, thus finding satellites rapidly.

The acquisition processor 100 of the illustrated embodiment, as shown in FIG. 2B, uses a time-domain flash correlator block 106 to construct the equivalent of a 32,768-tap long flash correlator in order to aid the rapid acquisition of signals. It does so by the use of a 256-tap physical correlator that is run in a faster-then-real-time manner, gaining a 8× increase based on the clock rate increase and a 16× increase by multiplexing multiple satellites simultaneously in a coherent integration interval up to 20 milliseconds.

The acquisition processor 100 is used during cold-start to find visible satellites for LEO and GEO applications. It is able to detect the presence of signals (code phase and Doppler) at GEO side lobe levels down to about 20 dB-Hz. The acquisition function is software controllable to adjust the integration period (i.e., its sensitivity to weak or strong signals), the satellite ID's to search, and the Doppler range. The acquisition function can search in parallel for up to 16 satellites at once, further aiding in the rapid acquisition of the signals. Subsequent Doppler bins are tested sequentially, looking for all satellites in the constellation not-yet detected. The processor 100 detects and reports the presence of the signal at a particular code phase and a particular Doppler frequency, allowing that information to be handed over to one of the traditional GPS channels for subsequent acquisition and tracking.

This method allows for rapid on-orbit cold-start, estimates of typical TTFF times (i.e., time to first fix) are about 30 seconds to acquire at least ten satellites in a cold-start mode, searching the full −40 KHz to +40 KHz Doppler space (at LEO) at a dwell time corresponding to detection of signals at or above 25 dB-Hz. Typical GEO Doppler range is +/−15 KHz.

Figure 1:
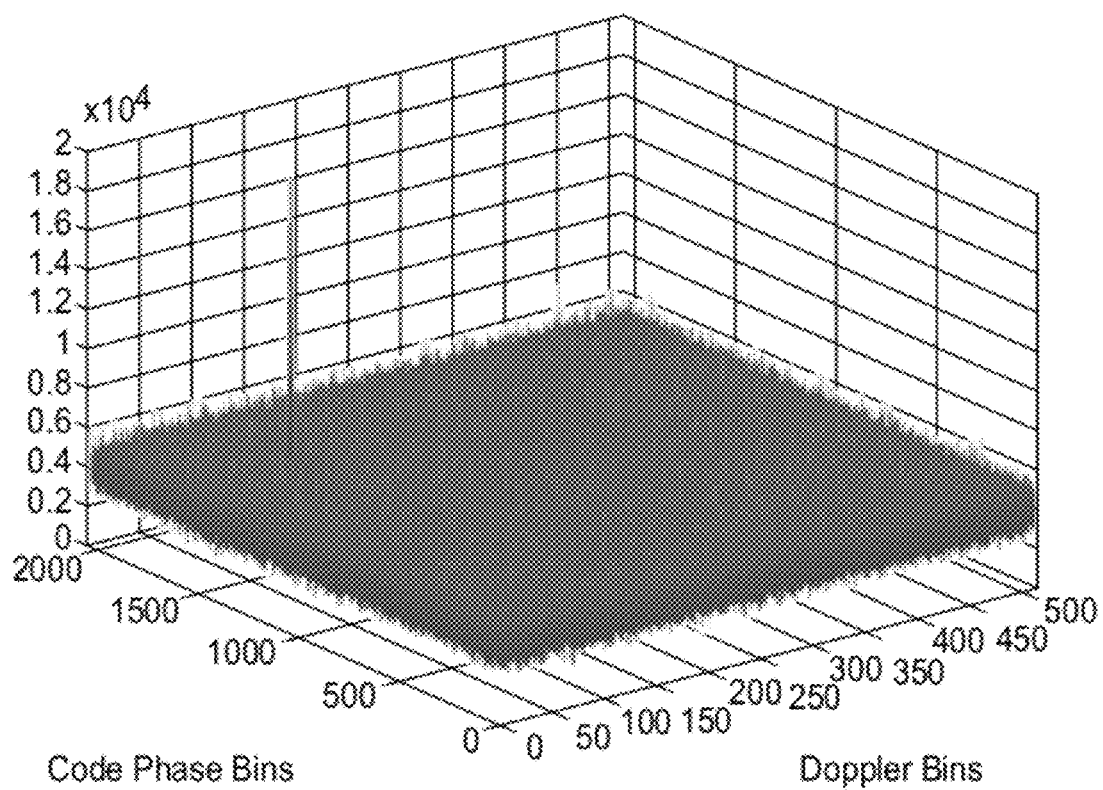
FIG. 1 is a chart illustrating an acquisition processor output, signal magnitude versus code phase versus Doppler, for one satellite.

An example plot of the output of a full Doppler/Code phase scan for one satellite is shown in FIG. 1, which illustrates that a single signal is detected at a particular Doppler and a particular code phase.

Figure 6:
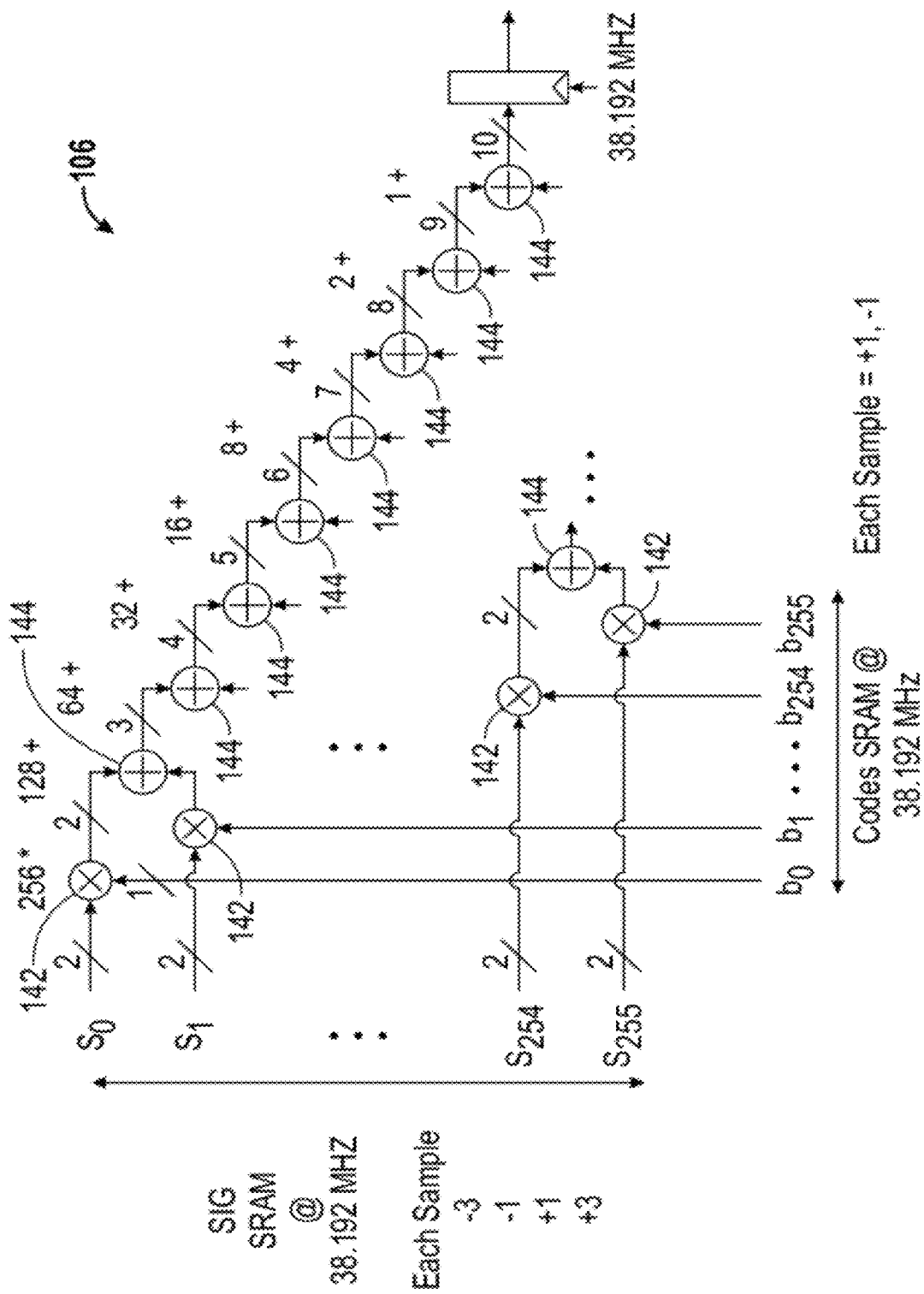
FIG. 6 is a block diagram illustrating a flash correlator design.

The method of the illustrated embodiment utilizes the time-sliced flash correlator 106, as shown in FIGS. 2 and 6. For successful detection of the C/A code, the 1023 chip, one millisecond long repeating code is sliced into slightly less than 0.5 chip increments to produce 2048 test cells. Code search detection is well known to be most optimized when searching the code phase space in approximately 0.5 chip spaced trial delays. The design slices the 2048 code phase test cells into eight slices of 256 half-chips each, the slices numbered 0 through 7. Each slice represents about $\frac{1}{8}^{th}$ of the total code length, each slice is processed sequentially, eight clocks are necessary to sum the correlation function over the entire 2048 test cells, each successive clock processes the slices numbered zero through 7. The coherent samples are stored in a 2048 word memory.

For each code phase delay tested, the algorithm requires eight system clock cycles to sum the eight slices for a single correlation sum. Each of the 2048 code phase delays are processed serially, requiring 2048 multiplied by 8 clock cycles, or 16384 clocks to process all of the In-phase signal components (sometimes referred to as "I signal components" or "I components") and an additional 16384 clocks to process all of the Quadrature signal components (sometimes referred to as "Q signal components" or "Q components"). Thus, one coherent integration period of data (2048 delays) can be correlated against the complete code phase delay in 2 multiplied by 16384=32768 clock cycles. The correlator 106 runs at the system maximum clock rate of 38.192 MHz, consequently it takes about 850 microseconds ("us") to complete the correlation on one satellite for all possible code phase delays. If a coherent integration memory 112 has summed data over 10 milliseconds, up to 11 satellites (10 ms/850 μs>11) can be processed in parallel during one 10 millisecond coherent integration period, the maximum number of satellites being time constrained. If a coherent integration period of 20 milliseconds is used, then the maximum of 16 satellites can be searched for simultaneously, the maximum number of satellites being memory constrained.

The processor 100 is controllable so that not all code phase delays need to be tested, unlike FFT-based algorithms that require that all 2048 delays be produced. As such, the time-domain approach described herein offers substantially better control for minimizing power consumption. The processor 100 is controllable to establish the code phase test range for each satellite scanned, which is very useful during a steadystate case in which the code phase uncertainty may be known over a limited number of code chips, say 100 or so. Of course, during cold-start, the full 2048 code phase delays are tested. In addition, the design is significantly smaller than FFT-based methods from a memory utilization and gate count perspective so that the acquisition processor, along with traditional GPS channel cell processing, all easily fit within the size constraints of a single radiation-hardened one-time-programmable FPGA (field programmable gate array), such as the Actel RTAX-2000 device. A description of the traditional GPS receiver including RF down converter and channel cell processing can be found in U.S. Pat. No. 5,148,452, which is hereby incorporated by reference.

FIGS. 2A and 2B show a block diagram of the processor 100, which is segmented into five modules 102, 104, 106, 108, 110. The five modules 102, 104, 106, 108, 110 include a Doppler removal and resampler module 102, a coherent integration module 104, the correlator module 106, a non-coherent integration module 108, and a peak detection module 110. Each module 102, 104, 106, 108, 110 is discussed separately below.

The acquisition processor 100 has enough memory storage to process up to 16 pseudochannels of information based on the size of a random-access memory ("RAM") 112 of the correlator 106 ("CODES RAM 112"), a RAM 114 of the non-coherent integration module 108 ("NCOHO RAM 114"), and a RAM 116 of the peak detection module 110 ("PEAK DETECT RAM 116", "PEAK RAM 116", or "PDET RAM 116"). The term "pseudochannel" refers to a particular segment of each of the RAM blocks 112, 114, 116 corresponding to a particular satellite that is assigned to that RAM block 112, 114, 116, each segment of RAM 112, 114, 116 (i.e., the pseudochannel) is processed in a time-sliced manner by the acquisition processor 100. From a timing perspective, the processor 100 has sufficient time to process a maximum number of satellites up to 16 (pseudochannels), the maximum number of satellites being dependent on the setting of a PDI counter (not shown) of a RAM 130 of the coherent integration module 104 ("COHO RAM 130"). PDI refers to the pre-detection integration interval, or the interval of time in milliseconds, that the coherent integration is summed within the coherent integration block in FIG. 2A. For example, see the table below, which displays the maximum number of satellites processed for each PDI:

| PDI | Max Satellites Processed |
|---|---|
| 1 | 1 |
| 2 | 2 |
| 4 | 4 |
| 5 | 5 |
| 10 | 11 |
| 20 | 16 |

Each pseudochannel in the processor 100 memory 112, 114, 116, 130 is controllable separately for integration time, detection status, and satellite ID. However, all should ideally be processed at the same PDI and Doppler value as these last two functions are controlled globally. A max_pseudochannels register (not shown) establishes how many pseudochannels to process (up to 16).

In a standard mode, memory address counters (not shown) reset at the end of each coherent integration PDI interval, restarting the algorithm on pseudochannel 0. The processor 100 starts at pseudochannel 0 and continues through the pseudochannel space until the PDI is terminated in the coherent integrator 104 or the maximum number of pseudochannels processed is reached. The maximum number of pseudochannels is set in the max_pseudochannels register. The maximum number of satellites processable is dependent on the run-time of the correlator function 106 and available memory.

In an alternating PDI mode, the memory address counters reset at the start of the even PDI intervals, but are set to 8 at the start of odd numbered PDI intervals. The processor 100 processes up to the max_pseudochannels register number of satellites for each even and each odd PDI interval. In this alternating PDI mode, the maximum number of satellites searched is 8, but two separate searches are formed for each of the two groups of eight. Each of the two groups are searched for using the 10 millisecond PDI, but each is offset by 10 milliseconds relative to the other into an even-10 ms and an odd-10 ms summation interval. The parallel and time shifted even and odd 10 millisecond summation intervals guarantee that at least one of the summation intervals (even or odd) avoids the 20 millisecond navigation data bit timing edges from each signal searched. The summation interval not containing the navigation data bit transitions will maximize the signal detection probability for that particular summation interval.

In either mode, any individual pseudochannel can be stopped or started while others continue to run.

In the Doppler removal and resampler module 102, as shown in FIG. 2A, the processor 100 accepts 19 MHz in-phase and quadrature data from a digital down converter (not shown) from either antenna (not shown) as selected by an antenna switch 118. A Doppler wipeoff numerically controlled oscillator ("NCO") 120 spins at an intentional 82.5 KHz rate, plus or minus the estimated Doppler of a particular set of satellites that will be tested. A controlling microprocessor 121, via software control, can set the test Doppler value into the NCO 120. Data is decimated to an effective 2.048 MHz sample rate by an integrate-dump process, the rate of 2.048 MHz is determined by a divide-by-14 ratio of the 28.644 MHz clock, the ratio modified to a divide-by-15 for one-time every 55 NCO carrier cycles. The divide-by-14 ratio is mechanized by a programmable divide-by-7 circuit 122 followed by a fixed divide-by-2 circuit 123. The divide-by-7 circuit 122 executes the divide-by-7 pattern all the time unless commanded to divide-by-8 one time. When commanded to divide-by-8, it executes the divide-by-8 pattern one time, then returns to the nominal divide-by-7 pattern. The intentional 82.5 KHz Doppler offset is induced by running a reference oscillator (not shown) low in frequency by 1 KHz, that is, 38.191 MHz instead of 38.192 MHz. The offset reference oscillator imparts an offset in the last intermediate frequency ("IF") to operate as a near-zero IF, which allows the signal processing to avoid the zero Doppler case in both the traditional GPS processing channels as well as the acquisition processor function. The method of offsetting the reference oscillator slightly to avoid zero Doppler is well known in the art.

The divide-by-8 pattern is commanded from one of two sources: (1) An NCO divide-by-55 source 124 and (2) the every rising edge of a 2 KHz signal (or the rising and falling edge of the existing 1 KHz reference clock). Both sources force the divide-by-8 substitution one time. Both sources operate in parallel, and no loss of divide-by-8 cycles can be lost. That is, if both sources indicate a divide-by-8 cycle, then the divider 122 must implement both divide-by-8 cycles (that is, two divide-by-8 cycles) before returning to the nominal divide-by-7 cycle. The cycle slippage function resamples the signal to be synchronous with a 2.048 MHz sample rate, produces precisely 2048 samples per millisecond, while compensating for code phase movement due to Doppler.

A SSB mixer 126 is a standard sideband mixer implemented in digital logic, where the signal input is one bit each for In-phase ("I") and Quadrature ("Q"), and the sine/cosine ("sin/cos") input from the NCO is also one bit each. The output for each In-phase and Quadrature path (not numbered) of the SSB mixer 126 takes on 3 possible states, +1, −1, and zero.

Figure 3:
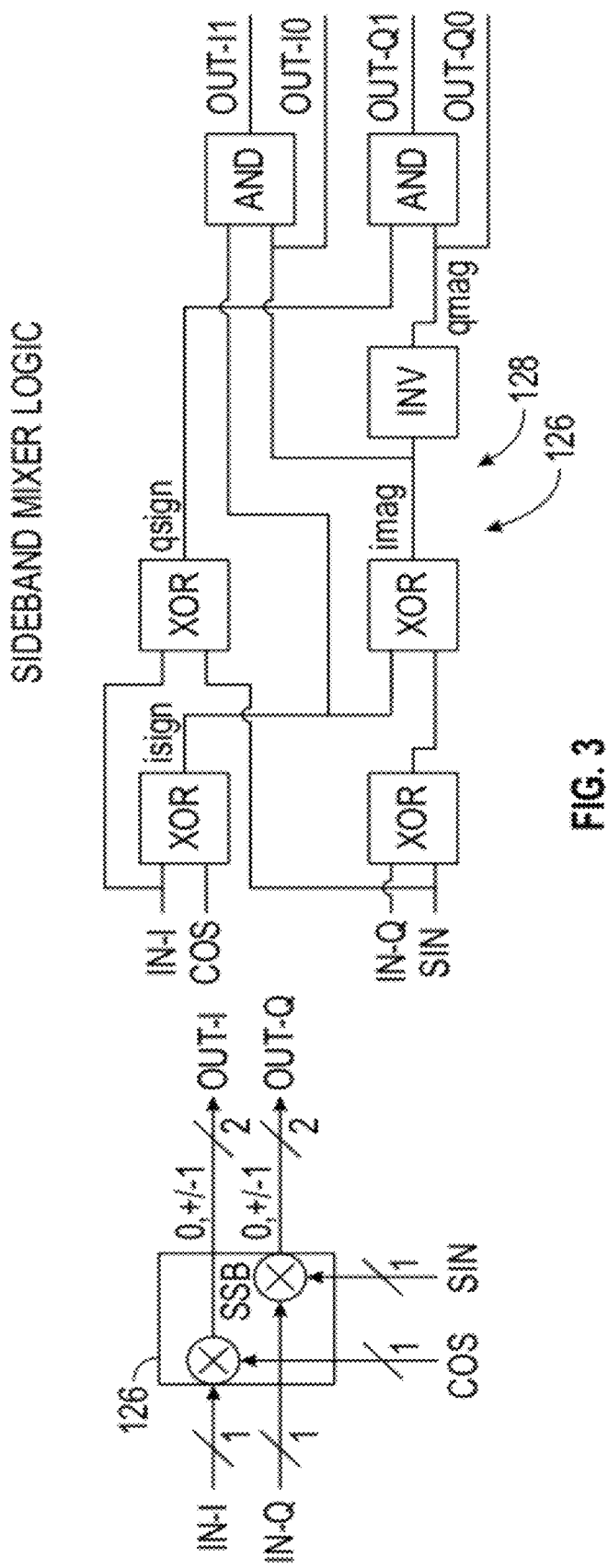
FIG. 3 is a block diagram illustrating acquisition processor sideband mixer implementation.

The SSB mixer 126 implements the following logic 128 as shown in the FIG. 3:

OUT_*I*=(IN_*I**COS−IN_*Q**SIN)/2;

OUT_*Q*=(IN_*I**SIN+IN_*Q**COS)/2;

wherein the binary equivalent is interpreted as follows (binary 1=+1 and binary 0=−1). The same sideband mixer logic is implemented in each channel cell.

Figure 4:
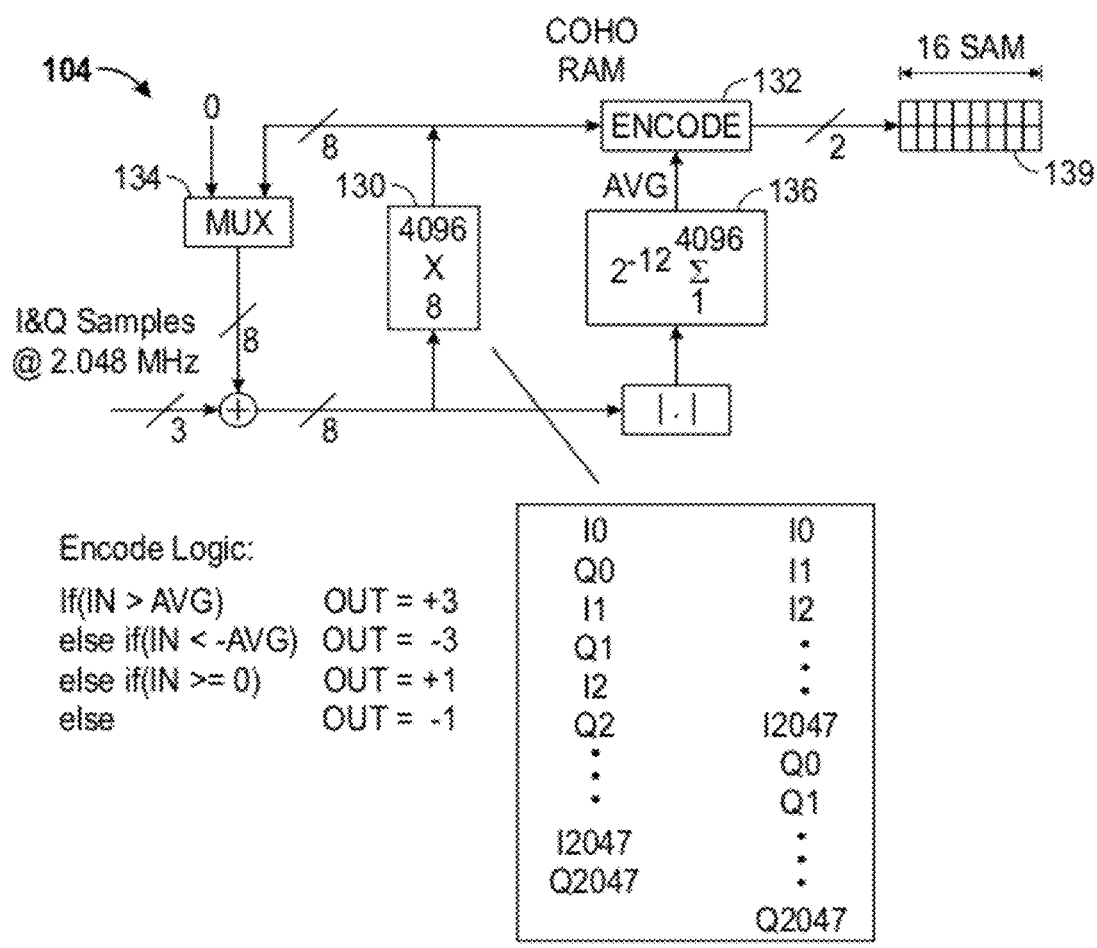
FIG. 4 is a block diagram illustrating the coherent integrator and memory configuration.

Turning again to FIG. 2A, and the coherent integration module 104, the 2.048 MHz in-phase and quadrature ("I&Q") samples can have bit-growth up to 3-bits wide each by the time they are summed at the output of the doppler removal and resampler module 102. The coherent integrator slices the one millisecond C/A code lengths into 2048 time bins corresponding to each of the 2048 COHO RAM 130 addresses. (The memory 130 in the illustrated embodiment is actually 4096 segmented words: 2048 words of In-phase signal components and 2048 words for Quadrature signal components, as shown in detail in FIG. 4).

The 2.048 MHz sample data set is sequentially added to successive memory cells in the 2048 COHO RAM 130 address cells over one millisecond. The COHO RAM 130 write address rolls back to zero at the start of the next one millisecond period, integrating the new sample with the old accumulated sum sample from the previous millisecond. The integrator 104 runs in this manner for a programmable number of integer milliseconds, called the coherent integration period, or PDI. When the PDI count is reached, the current sum (summed over the PDI interval) is dumped into the correlator module 106 through an ENCODE block 132 while the next coherent interval is started. At the start of the next PDI interval, a multiplexer ("MUX") 134 at the top of the adder cell is set to produce zero, thus the first sample of the new interval is initialized into the COHO RAM 130, starting the next summation.

As the summation continues, the start of each millisecond summation period resets an average computation element when the new sums are written back to the RAM 130. The average magnitude computation ends at the end of the one millisecond sample. The average magnitude computation function 136 computes the average magnitude of each signal component for all 4096 I&Q samples. The average is simply the sum of the magnitudes of each of the 4096 elements shifted by 12 bits. The output average ("AVG") is then latched for one millisecond and made available to the ENCODE function 132.

At the end of the PDI interval, the accumulated data stored in the 4096 memory words is transferred from the COHO RAM 130 and sequentially read out through the ENCODE function 132 to truncate the accumulated data from up to 8-bits to 2-bits. The ENCODE function 132 reduces the number of bits from 8 to two so they can be stored in the correlator module 106 data RAM 140 efficiently. The encoding is based on an optimum method for encoding GPS pre-detection data in two bits. The encoding is relative to the AVG output determined over the most recent summation data stored in SRAM, and is as follows (in pseudo-code):

```
ENCODE( )
{
    If(IN>AVG)           OUT = +3
    else if(IN <−AVG)    OUT = −3
    else if(IN >=0)      OUT = +1
        else             OUT = −1
}
```

The four output states of the ENCODE function 132, +3, +1, −1, and −3, are encoded in any convenient form that minimizes the down-stream correlator 106 size as long as the encoded data is made to represent the magnitudes of the output data as shown in the encode function 132 above. One example is that binary 00 represents decimal +3, binary 01 represents decimal +1, binary 10 represents decimal −3, and binary 11 represents decimal −1. Other examples can be used that minimizes the implementation of the downstream correlator 106.

The output encoding operation can occur at much faster rate than new samples being written into the COHO RAM 130. The 4096 samples can be read out at the maximum 38.192 MHz clock rate, which will take 107 microseconds to extract and can be designed so that new samples for the next PDI period are overwritten data cells that have already been extracted.

The data stored in the COHO RAM 130 contains data from all satellites that are in a Doppler band specified by the NCO frequency, the width of the Doppler band (in Hz) being approximately proportional to 0.5/PDI, where PDI is the total coherent integrator 104 collection time period in seconds. Allowable values of PDI include any number between 2 and 20 milliseconds inclusive.

Figure 5:
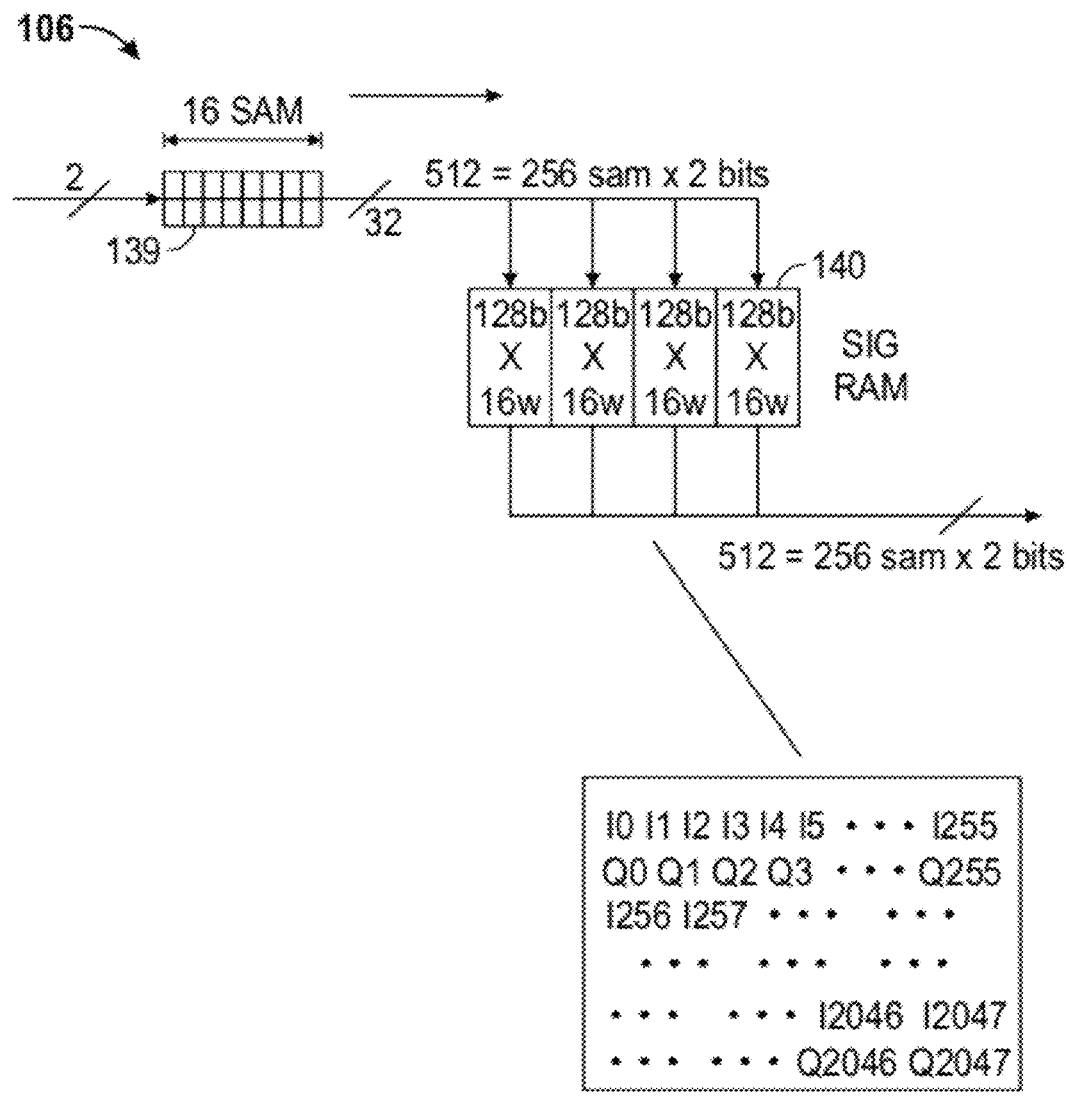
FIG. 5 is a block diagram illustrating the transfer and mapping of data from COHO RAM to SIG RAM.

The coherent integrator 104 deposits its results in dedicated SIG RAM 140 at the front-end of the flash-correlator block 106 through a serial-to-parallel converter block 139. The SIG RAM 140 data is organized as shown in FIG. 5, wherein word 0 contains the first 256 samples of I, word 1 holds the first 256 samples of Q and so forth through word 15.

Once the SIG RAM 140 data is loaded, the correlation function 106 can begin. Starting at word 0, each clock cycle advances the read-address by one, resetting to zero after the word 15. The SIG RAM 140 read function simply repeats this cycle over and over again until the end of the next PDI interval, when the new samples from COHO RAM 130 are transferred to the SIG RAM 140.

The correlator 106 is constructed as a flash-parallel pipelined block that multiplies 256 two-bit samples by 256 one-bit samples and sums all 256 products to produce one 11-bit summation. FIG. 6 shows a detailed block diagram of the flash correlator 106. The design consists of 256 discrete multipliers 142, that take the two bit samples and multiplies by the +1 or −1 single bit PN code sample from the CODES RAM 112. The output of each multiplier 142 is three bits in order to twos-complement encode the multiplier 142 output of +3, +1, −1, or −3. An adder 144 is utilized to sum the output of one multiplier 142 with another multiplier 142. After each stage of addition, the number of adders 144 is reduced by two and the number of bits of summation grows by one. For example, at the first state of summation, there are 128 total adders 144 that add 2-bits to 2-bits and produces a 3-bit sum.

At the next stage of summation, there are a total of 64 adders 144, each adding 3-bits to 3-bits and producing a 4-bit result. The process continues until the $8^{th}$ stage of summation, which one adder 144 adds 9-bits to 9-bits and produces a 10-bit sum. Of course, where needed, pipelining flip-flops (not shown) are be inserted at the appropriate stage to allow for the correlator 106 to produce one correlation sum every 38 MHz clock cycle. The output of the flash correlator block 106 sequentially produces I and Q sum-of-products for each of the 256-sample slices of the spreading code. The I terms and Q terms are further summed over the entire one millisecond code delay producing a single I and Q summation representing the correlation of the signal (stored in SIG RAM 140) multiplied by the CODE (stored in CODE RAM 112), and accomplishes the summation for 1 and Q elements in 16 pipelined clock cycles. The I and Q sums are stored in separate I and Q registers at the output of the correlator block 106 for further down-stream processing in the non-coherent integration block 108.

Figure 7A:
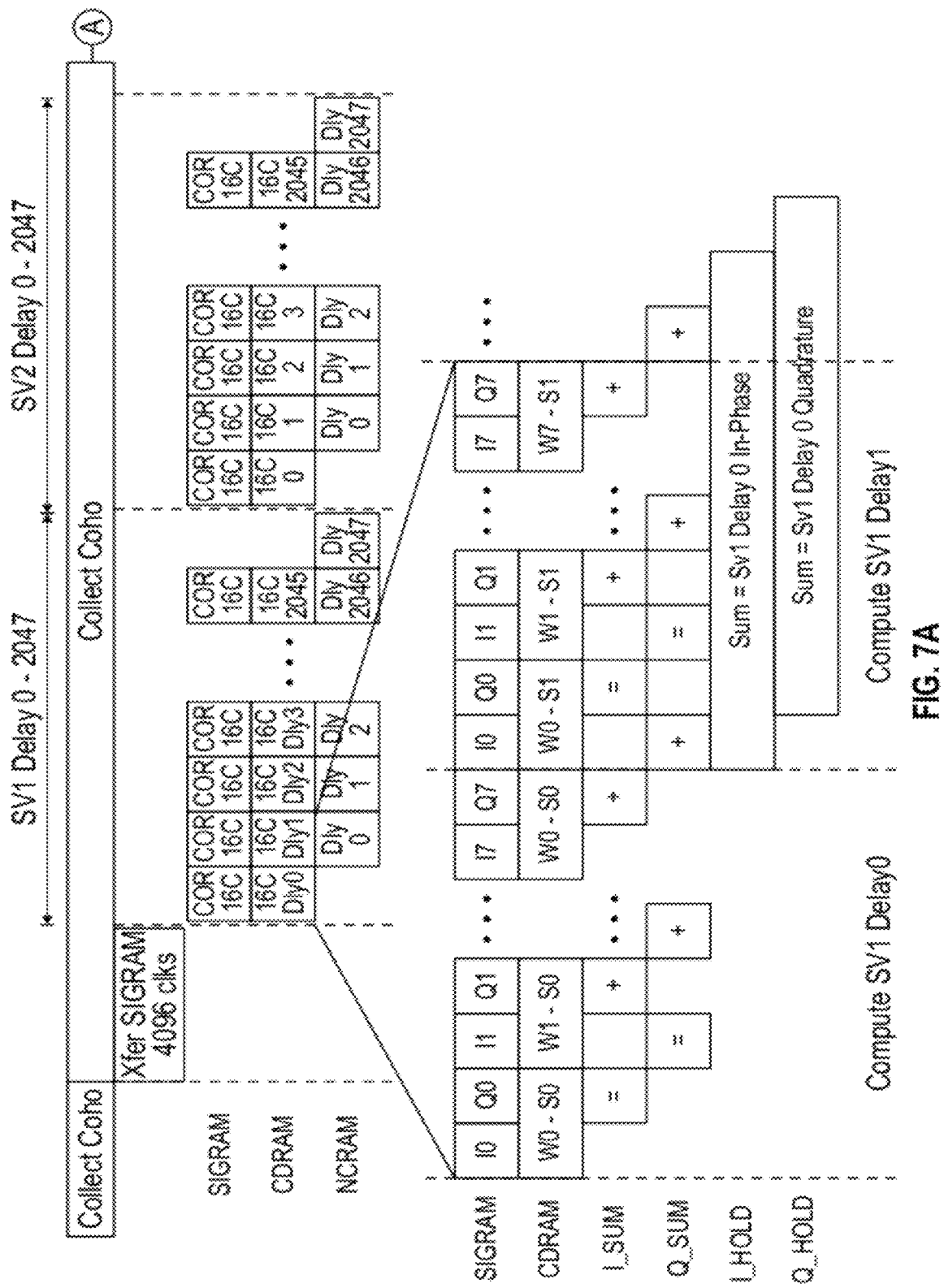
FIGS. 7A and 7B are a diagram illustrating top level timing diagram of correlator function.
Figure 7B:
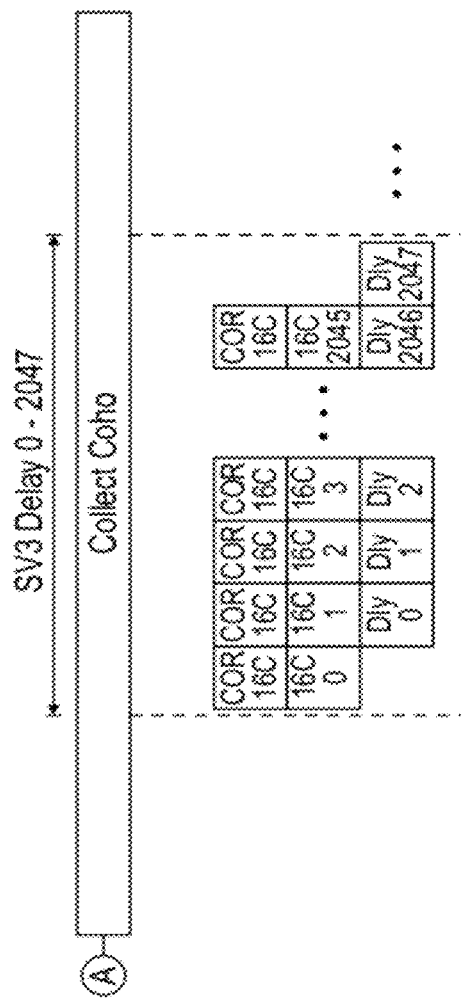

The correlation process is best described by examining the connections between the SIG RAM 140, CODE RAM 112, correlator block 106, an I-SUM register 146, and a Q-SUM register 148 in FIG. 2B, while referring to the timing diagram of FIGS. 7A and 7B.

Correlator 106 activity begins after the PDI interval is complete and data has been collected in the COHO RAM 130. As shown in FIGS. 7A and 7B, at the end of the coherent collection period (i.e., the PDI), 4096 clocks are necessary to transfer data from the COHO RAM 130 to the SIG RAM 140. After the SIG RAM 140 is filled, correlation summation can begin, it is best described in the lower-section of FIG. 7A.

The SIG RAM 140 operation is as follows. The data is organized as described earlier in FIG. 4. Data is read out sequentially, one address at a time, starting at word 0 through word 15. The sequence repeats continuously until the next PDI interval is completed.

The CODE SRAM 112 presents the eight segments of the pseudorandom noise code ("PN code") to the correlator 106 as shown in FIGS. 7A and 7B. Since one code delay applies to both the I- and the Q-components, data is extracted out of the CODE SRAM 112 one code word for every two clock cycles. All eight code segments of the first signal delay (word 0 shift 0) through (word 8 shift 0) are presented to the correlator block 106 after 16 clock cycles. An I-SUM register 146 and a Q-SUM register 148 take turns on alternate clock cycles summing the segmented correlation sums, so at the end of the 16 clock cycle operation, the I-SUM register 146 contains the complete correlation sum for delay zero (in-phase), and the Q-SUM register 148 contains the complete correlation sum for delay zero (quadrature). The I-SUM and Q-SUM registers 146, 148 are transferred respectively to an I-HOLD register 150 and a Q-HOLD register 152 for further processing by the non-coherent integration block 108.

In the process of presenting delay-zero spreading codes to the correlator 106, it is required that 1023 bits of the code be sequentially read out of the CODE RAM block 112. While it is read out to compute the current correlation sum, it is shifted by one bit and stored back into the CODE RAM 112, so that on the next correlation sum (i.e., delay 1 in this example), the process of reading out the CODE RAM 112 will then present the correlator 106 with a 1-tap delayed version of the spreading code. Every 16 clock cycles, the contents of the CODE RAM 112 is shifted by one bit position, effecting the delay operation necessary to form the correlation sum for the next summation.

One technique of implementing the shift operation of the spreading code bits, shown in FIGS. 7A and 7B, is to implement two bits per spreading code bit, i.e., storing the 1023 bits in 2048 memory cells, turning the CODES RAM 112 into 256 bits×8 words. The shift operation then works one shift for every time the spreading code is read out of CODES RAM 112.

Figure 8:
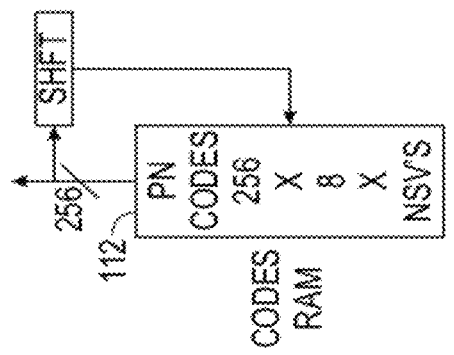
FIG. 8 is a block diagram illustrating the CODES RAM function.

A block diagram of the CODES RAM 112 is shown in FIG. 8. The CODES RAM 112 has a plurality of functions. One function is to store the 1023 PN spreading code bits for up to 16 satellites at a time, resampled to 2.048 MHz for slightly less than 0.5 chip spacing. Another function of the CODES RAM 112 is to deliver the expanded codes sequentially, 256 bits at a time, to the correlator 106. Another function of the CODES RAM 112 is to shift the PN spreading codes one bit position for the next correlation iteration. Yet another function of the CODES RAM 112 is to store the shifted PN spreading code bits one position for the next cycle. Another function of the CODES RAM 112 is to restore the PN spreading code bits to their original position after 2048 correlator iterations. Yet another function of the CODES RAM 112 is to allow for the controlling microprocessor 121, via software, to load different spreading code patterns into one or more of the 16 memory slots of the CODES RAM 112. The microprocessor 121 must first stop the pseudochannel by setting a pseudochannel start/stop bit to zero, part of the overall acquisition processor 100 control register.

Turning now to the non-coherent integration module 108, coherent I and Q correlation sums appear in the I-HOLD and Q-HOLD registers 150, 152 at a rate of 2.387 MHz. For each GPS satellite, there will be 2048 sequential values of I-HOLD and Q-HOLD representing each of the 2048 possible code phase delays. The data is further summed non-coherently using a magnitude squared computation (I-HOLD$^2$+Q-HOLD$^2$) block 154. The magnitude-squared sum is then further summed into a 32-bit result stored in the NCOHO SRAM 114. The NCOHO RAM 114 is an 8-bit wide device, so at least 8 clock cycles are necessary to sum the 32-bit magnitude squared result with the previous value stored in the SRAM corresponding to the code phase delay being processed. The magnitude-squared function has 16 clock cycles to compute its result before the next I-HOLD and Q-HOLD arrive in the registers 150, 152, so a single time-shared efficient serial multiplier is preferred. However, alternative implementation will be recognized by those skilled in the art.

The Non Coherent Integration RAM 114 is implemented via one 128K×8 SRAM. The memory space is organized into 16 pseudochannels, each pseudochannel uses an 8K byte block of SRAM. The 8K block stores the non-coherent sum for 2048 delays of code space for each pseudochannel, four bytes (32 bits) of data for each code phase delay.

The non-coherent integration module 108 for a particular pseudochannel can be reset so that the NCOHO SRAM 114 is cleared for that pseudochannel only. The non-coherent integration module 108 also resets the number-of-updates counter in the peak detector function, and allows for the processor 100 to load up the CODES SRAM 112 for an individual pseudochannel (with the pseudochannel start/stop bit set to STOP). The controlling microprocessor 121, under software control, can stop and start individual pseudochannels while others continue to run.

The peak detector 110 aids the controlling microprocessor 121 in detecting the presence of satellite signals. The detector 110 uses its own memory called PEAK RAM 116 for detecting signals. In the illustrated embodiment, the PEAK RAM 116 is implemented with one internal Actel RAM block, configured for 37 bits by 128 words. For each satellite in the pseudochannel space, the following data is stored in the PEAK RAM 116: (1) maximum signal magnitude (32 bits); (2) next largest signal magnitude (32 bits); (3) next2 largest signal magnitude (32 bits); (4) address of the max signal (32 bits); (5) address of the next max signal (32 bits); (6) address of the next2 max signal (32 bits); (7) sum of all 2048 NCOHO elements in the pseudochannel space (32 bits, scaled to fit within 32 bits, for example, scaled by 2^−8); and (8) the number of times the non-coherent module 108 pseudochannel space was summed since being reset (32 bits). This arrangement in PEAK RAM 116 memory consumes 8 longwords per pseudochannel.

The detector 110 simply saves the data away, and detection is determined by the controlling microprocessor 121 software using a detection method referred to as a "peak proximity test". Detection is likely when the three largest signal elements in the 2048 memory locations are adjacent to each other in the address space. While a particular pseudochannel is being updated for its non-coherent summation, the peak detector 110 uses a three-deep comparison tree to find the three largest values in the non-coherent memory block 114 and the addresses associated with the three largest elements. These three largest values and the associated addresses are stored in a pseudochannel specific section of the PEAK RAM 116. The PEAK RAM 116 is then examined by the controlling microprocessor 121 for a signal detection For each satellite updated in NCOHO RAM 114, the peak detector 110 stores the signal magnitudes for the three largest elements within the 2048 sample space in the PEAK RAM 116, along with their corresponding addresses. Also stored in the PEAK RAM 116 are the number of updates of the NCOHO RAM 114, and the sum of all 2048 elements within the pseudochannel space. This data enables rapid (i.e., low MIPS) determination that a signal has been detected, and the address corresponds to the code phase delay for the signal.

A method of determining an optimized search order, including an optimized GEO altitude sky search algorithm, will now be described in greater detail.

The acquisition processor 100 described herein is a dedicated GPS satellite search function that is controlled by software to identify the visible satellites, and their associated Doppler and code phase. This information is then transferred to traditional GPS tracking channels, where the GPS satellites SV are acquired and tracked normally using any of the traditional methods.

The algorithm for acquiring satellites from a cold-start can be judged by the time it takes the receiver to start the position calculation function once power is applied to the unit. Generally it is required to acquire at least four satellites before the GPS location computation can be started. Thus, from an acquisition time perspective, the time between turn-on and the time the unit has acquired four or more satellites in a tracking state is the important metric.

The capabilities of the acquisition processor 100 can be taken into account in the design of the acquisition algorithm. A number of different techniques for driving the GPS acquisition processor 100 via control software are described in order to minimize the on-time of the processor 100, thus reducing power and minimizing the search time to acquire enough satellites for an initial first fix.

Figure 9:
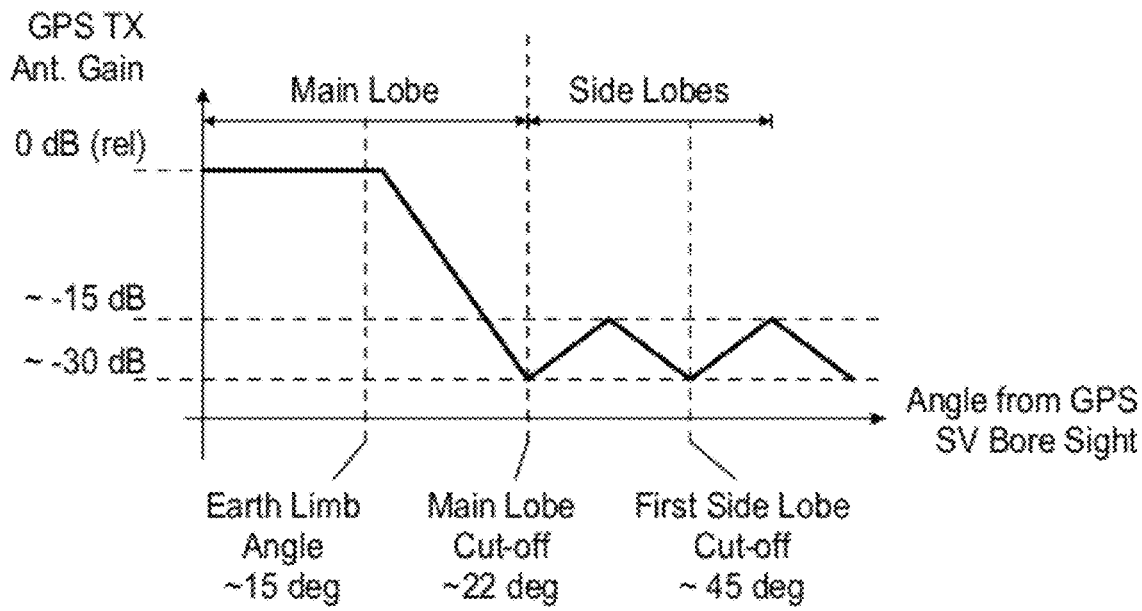
FIG. 9 is a chart illustrating a typical GPS transmit antenna gain pattern as viewed from GEO altitudes illustrating the main-lobe and side-lobe portions of the signal.
Figure 10:
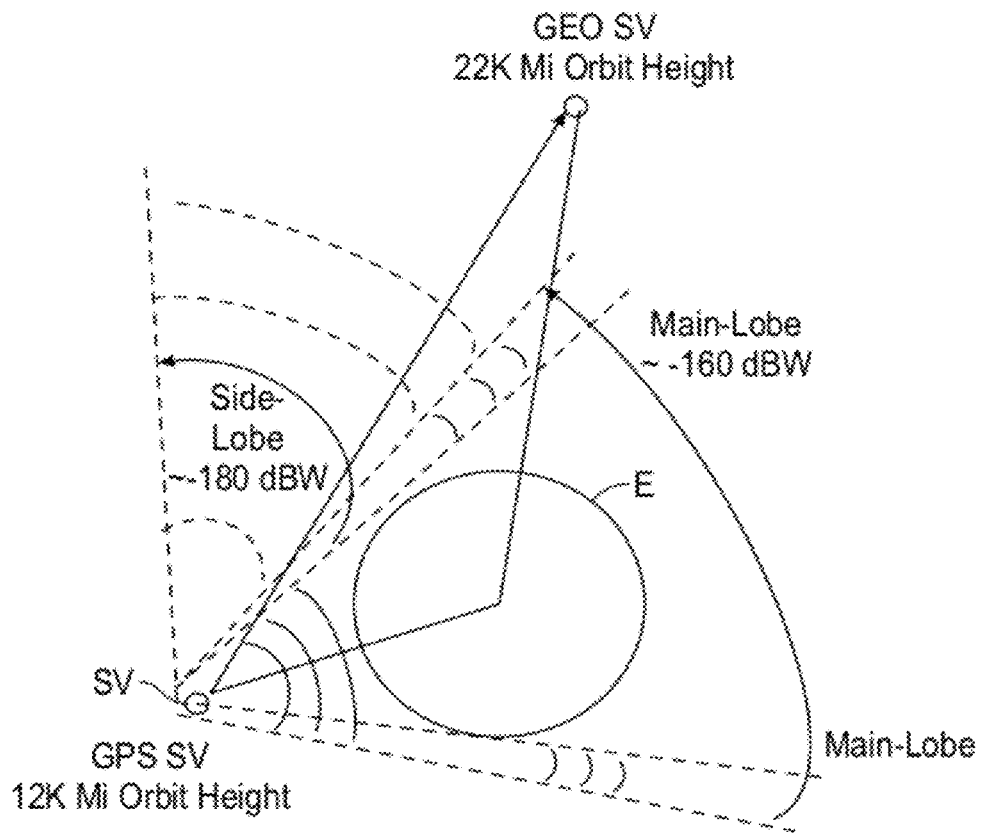
FIG. 10 is a diagram illustrating the geometry of GPS Transmitter to GEO Receiver Path.

Acquiring GPS satellites SV at GEO is particularly taxing to GPS receivers as the signal power available for most satellites is significantly reduced, e.g., 15-30 dB lower signal power than GPS receivers on the surface of the Earth E. This is mainly because the GPS transmit antennas (not shown) focus energy on the surface of the Earth E and the signals available at GEO altitudes result from a portion of a GPS transmit antenna main-lobe pattern leaking past the rim of the Earth E and the remaining signal being transmitted from the transmitting GPS satellite antenna sidelobe, where the signal power is not specified. See FIGS. 9 and 10 for examples of the transmit GPS satellite antenna pattern, and showing that portion of the antenna pattern that is available from GEO altitudes from the main-lobe and side-lobe patterns of the transmitting antenna. Of course, the resulting received signal power is a product of the transmit antenna pattern on the transmitting GPS satellite and the receive antenna pattern on the receiving GPS receiver at GEO altitude, and the corresponding range loss. FIG. 9 is a stylized version of a previously published "average" GPS transmit antenna pattern from The Institute of Navigation ION-GPS-2002 conference proceedings, September 2002, titled "Results from the GPS Flight Experiment on the High Earth Orbit AMSAT OSCAR-40 Spacecraft" by Moreau et al.

One aspect of any GPS receiver at GEO altitudes is that it is generally constrained to be above the equator at about 22,000 miles orbit altitude. This allows the GEO spacecraft to appear to hover at the same point in the sky as observed from the ground as the orbit period at this altitude is exactly 1 earth day, or 24 hours.

Recognizing that the signals from GPS satellites SV at GEO altitudes can be described as coming from main-lobe or side-lobe signal pathways, the main-lobe signals being distinguished as having a received carrier-to-noise power ratio ("C/No") that is substantially above a threshold, e.g., 35 dB-Hz. The signals received from a sidelobe pathway have a signal power below a certain threshold, such as below 30 dB-Hz. Also recognizing that the search time to detect mainlobe signals is substantially faster than sidelobe signals, a search algorithm that searches for mainlobe signals first, then dwells longer looking for sidelobe satellite signals not acquired in the main-lobe scan, has been developed.

The search algorithm includes the step of searching for all satellites using a main-lobe signal detection threshold above a certain threshold by dwelling quickly per satellite (e.g., 2-4 milliseconds per satellite per code phase per Doppler bin). The search algorithm also includes the step of searching for all satellites not acquired in the previous step using a sidelobe signal detection threshold above a certain threshold by dwelling slowly per satellite (e.g., 100 milliseconds per satellite per code phase per Doppler bin).

The main-lobe satellite scan may be accomplished iteratively using the acquisition processor 100 or using standard (traditional) GPS channels as follows:

```
Set scan time to 2 ms PDI (search or main-lobe signals first)
For(NCO Doppler = −6KHz to 6 KHz step 250 Hz) (main-lobe signals at
GEO altitudes are constrained to +/− 6 KHz Doppler)
{
    For(sv = 1 to 32)
    {
        if(sv not detected) // about 4 ms per update cycle
        {
            turn acquisition processor off
            load CODES RAM with SV(i)
            turn on acquisition processor
            wait for 1-5 PDI counter updates
            if(detection)
            {
                update VISIBILITY table with detection
            }
        }
    }
}
```

The total search time to cover all GPS satellite IDs (1-32) at all possible Doppler ranges (+/−6 KHz) using 2-4 millisecond dwell time per satellite would be given by:

$$T_{main\_lobe} = 32 * 12 \text{ KHz}/(0.5/0.002 \text{ sec}) * 0.004 \text{ sec} = 6 \text{ seconds},$$

where "0.5/0.002 sec" is the Doppler bin width given a 2 millisecond pre-detection integration period (PDI).

Thus, it takes only six seconds to sequentially search for all GPS satellites at all code phases at all Doppler ranges using the acquisition processor 100 as described herein to find mainlobe signals.

A secondary scan using a much longer dwell time per look in order to detect signals down to, e.g., 25 dB-Hz, is then run, the algorithm scans all GPS satellites not already acquired from the mainlobe scan, as follows:

---

10 ms PDI (search or side-lobe signals) and non-coherent integration period of 100-120 milliseconds
For(NCO Doppler = −14KHz to 14KHz step 50 Hz) (sidelobe signals constrained to +/− 14 KHz Doppler)
{
    For(the next 16 satellite ID's that are not yet detected) // (abt 100-120 ms per update cycle)
    {
        turn acquisition processor off
        load CODES RAM with the 16 satellite ID's
        turn on acquisition processor
        wait for 10-12 PDI counter updates
        if(detection)
        {
            update VISIBILITY table with detection for each of the 16 satellites detected
        }
    }
}

---

Similarly, the search time to go through all 32 possible satellites at all possible Doppler and code phase bins is given by:

$$T_{sidelobe} = (32\ SV/10\ Svs\ at\ a\ time) * 560\ Doppler\ bins * 120\ ms \sim 3.6\ min$$

$$2 * 14\ KHz/50\ Hz\ per\ bin = 560\ Doppler\ bins$$

Methods of improving or reducing the total search time include scanning in the Doppler space where the Doppler probability is at a maximum, or adapting the search algorithm to constrain the search for the remaining satellites with information learned from satellites already acquired. Each is discussed separately below.

One method to reduce the search time is to only scan the Doppler space in a Doppler region that maximizes the probability of detecting satellites. See FIGS. 11 and 12 which are useful in describing the method.

Figure 11:
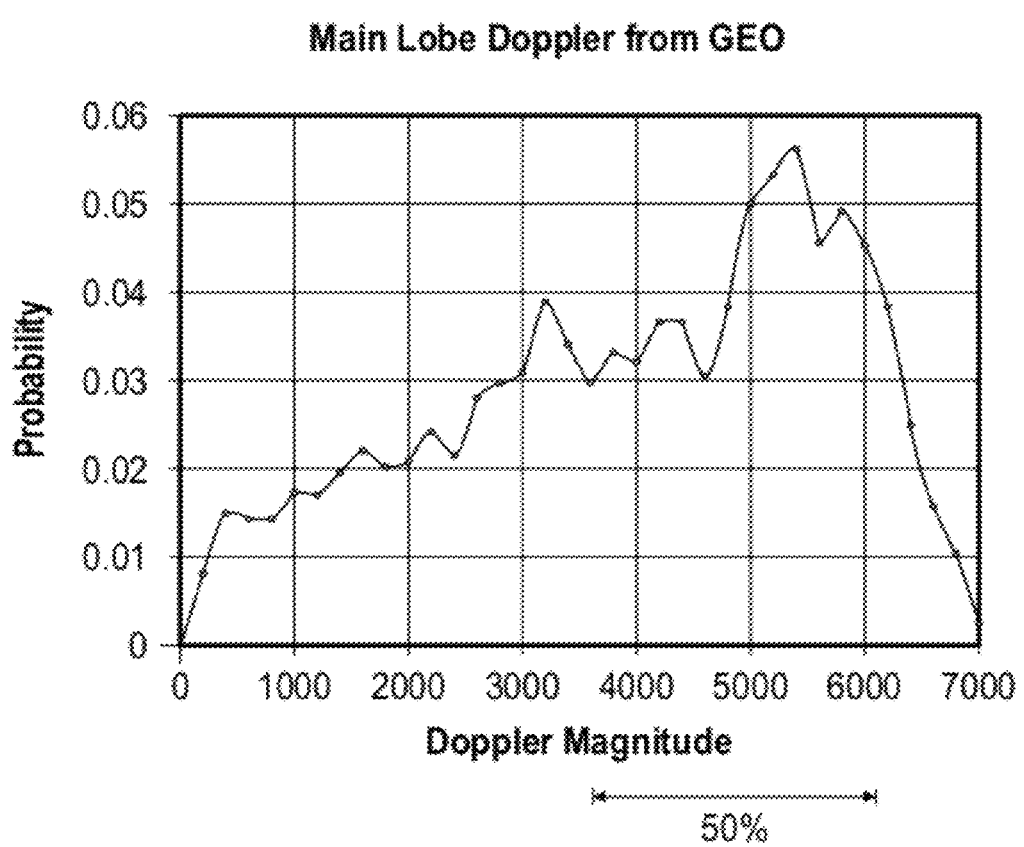
FIG. 11 is a chart illustrating a Doppler probability profile vs. Doppler magnitude of mainlobe signals observed at GEO.

FIG. 11 illustrates that the mainlobe signals observed at GEO do not provide a uniform probability density function across the Doppler space. It is much more likely that the Doppler magnitude of observed mainlobe GPS satellites is above 3 KHz than below 3 KHz. More specifically, 50% of the mainlobe signals exist between 3 and 6 KHz magnitude, thus a focused first scan in this region will identify 50% of mainlobe signals if they exist by scanning less than half of the total search space.

Figure 12:
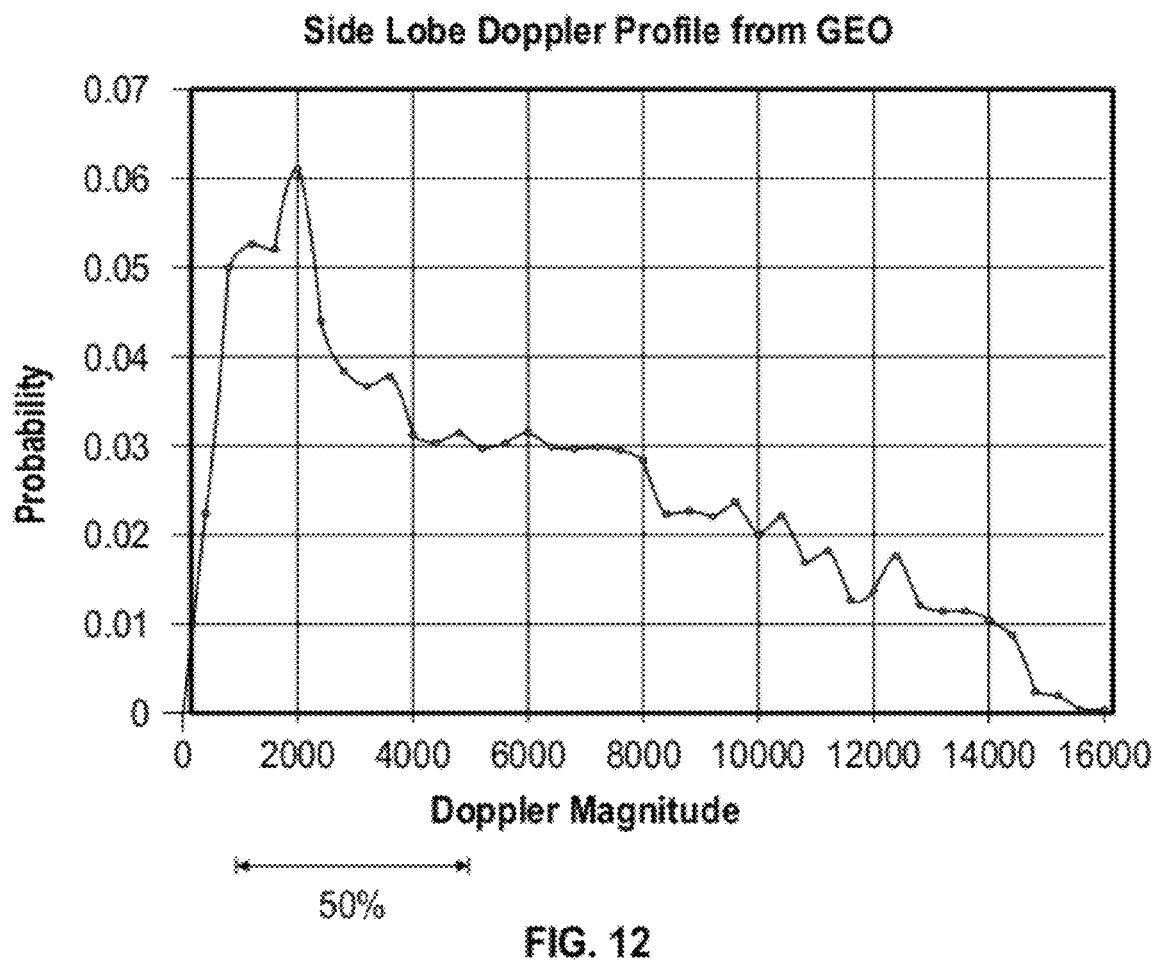
FIG. 12 is a chart illustrating a Doppler profile of sidelobe signals observed from GEO altitude.

FIG. 12 illustrates that the sidelobe signals observed at GEO do not provide a uniform probability density function across the Doppler space. It is much more likely that the Doppler magnitude of sidelobe satellites is below 5 KHz than above 5 KHz. More specifically, 50% of the sidelobe signals exist between 1 and 5 KHz, this a focused first scan in this region will identify 50% of sidelobe signals if they exist by scanning less than ⅓ of the total search space.

A four-step scan searches the high probability regions first, followed by lower probability regions, as follows:

Search 1: −6K<=−3K; 3K<=6K MAINLOBE search (~3 sec)
Search 2: −3K<=−0.5K; 0.5K<=3K MAINLOBE search (~3 sec)
Search 3: −5K<=−1K; 1K<=5K SIDELOBE search (~35 sec)
Search 4: −14K<=−5K; 5K<=14K SIDELOBE search (~70 sec)

The total search time to the end of the list is the same, but the probability of finding satellites earlier in the search is improved greatly because the method searches first where the probabilities are highest. The total search time for initial first fix may be accomplished in about one minute.

Another method includes adapting the search order dependent on information obtained from satellites already acquired (i.e., the adaptive satellite search order is dependent on acquired satellite information).

Figure 13:
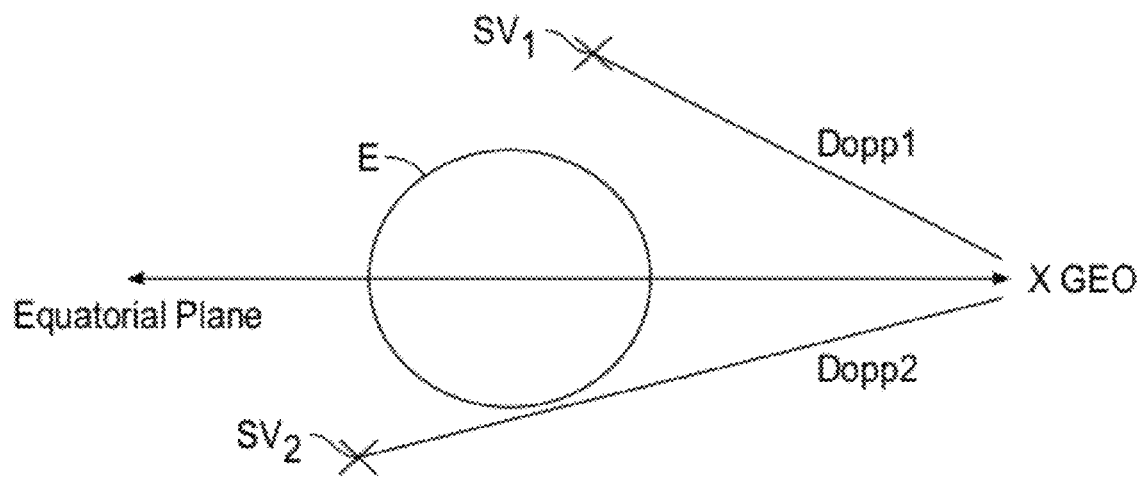
FIG. 13 is a schematic view illustrating the geometry of the first two GPS satellites acquired from a GPS receiver on a GEO platform.

The fact that the GEO satellite is constrained to be at a 22,000 mile high orbit at or near the equator provides additional information that can be exploited to reduce the search for subsequent satellites once a first (or second) satellite is acquired. The general case is that of two satellites initially acquired, as described here. FIG. 13 shows a GPS receiver at GEO altitude having acquired two GPS satellites $SV_1$, $SV_2$, with measured Dopplers Dopp1, Dopp2.

For this case, it does not matter if the GPS satellites $SV_1$, $SV_2$ are from mainlobe or sidelobe signals. The constellation of possible locations of the GEO satellites includes all locations on a circle of 22,000 mile altitude directly above the equator, called the GEO altitude orbit circle. Thus, given the GPS receiver has a stored almanac, the following steps define the algorithm.

The algorithm 200 includes the step 201 of acquiring a first and a second GPS satellite $SV_1$, $SV_2$ using any technique. The algorithm also includes the step 202 of determining the position and velocity vector of the first and second GPS satellite $SV_1$, $SV_2$ using time. The algorithm further includes the step 204 of computing a measured Doppler difference as the difference of the measured Doppler Dopp1, Dopp2 from the first and second GPS satellites $SV_1$, $SV_2$. The algorithm also comprises the step 206 of computing a predicted model of the Doppler difference between the first and second GPS satellite $SV_1$, $SV_2$ when the GPS receiver is constrained to be on the GEO altitude orbit circle. The algorithm further comprises the step 208 of computing an approximate position of the GPS receiver based on the measured minus predicted model Doppler differences. The algorithm also includes the step 210 of computing the position and velocity vector of the remaining satellites in the GPS constellation using an almanac and time. Finally, the algorithm further includes the step 212 of computing a preferred satellite search order and reduced Doppler search range for each of the GPS satellites not yet acquired based on the computed position and velocity vector of the remaining satellites.

The time in step 202 can be determined from demodulating data from the first or second tracked satellite $SV_1$, $SV_2$. Alternately, the time in step 202 can be determined from an approximate time loaded into the GPS receiver at the start, the initial time estimate incremented by the GPS processor software by a pre-determined time on an interrupt time event or based on some other timer. The location and velocity data of the first and second satellites $SV_1$, $SV_2$ can be determined from almanac data or from ephemeris data.

The algorithm 200 described above can be applied in the range domain as in the Doppler domain.

Figure 14:
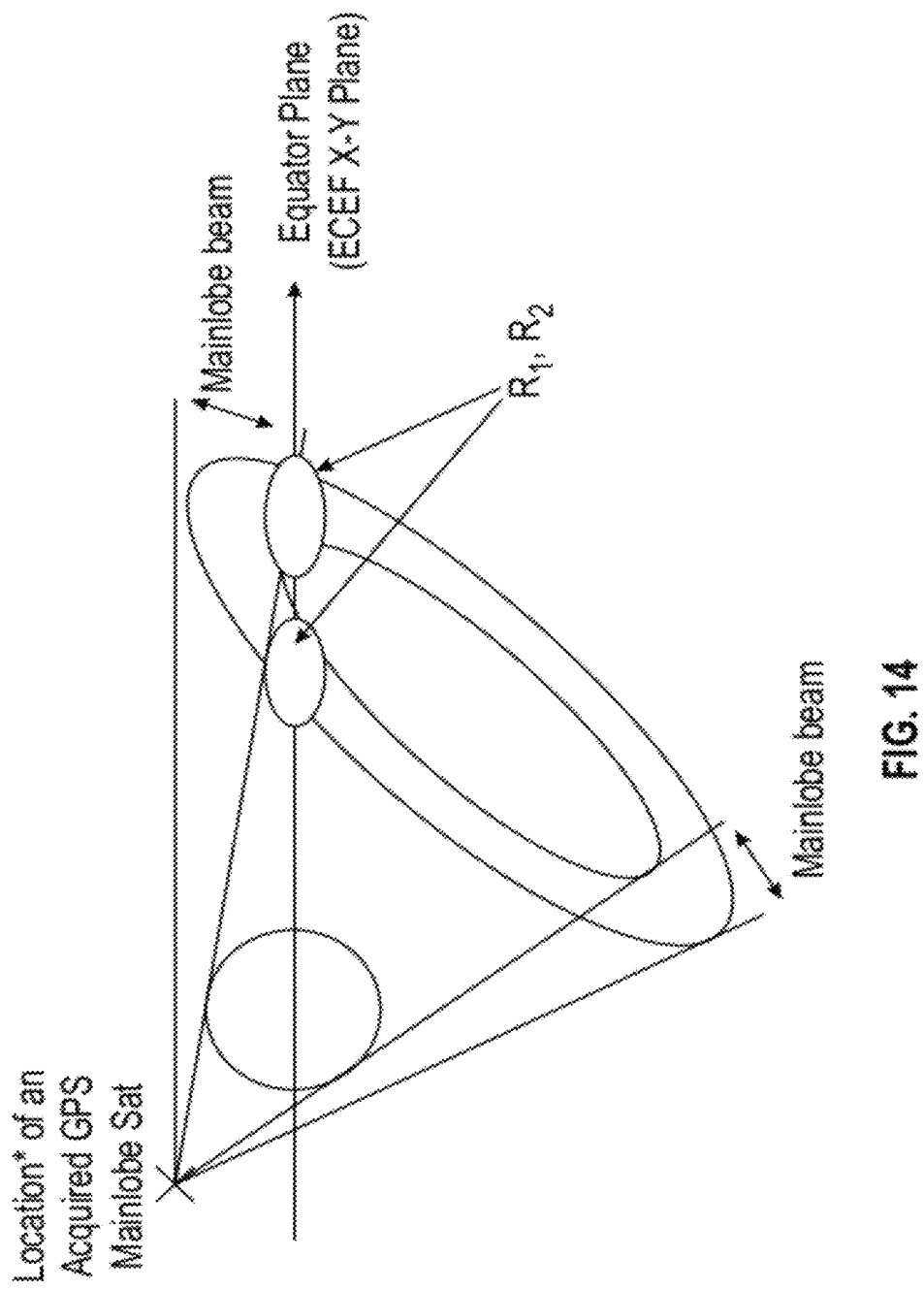
FIG. 14 is a schematic view illustrating an approximate position determination by one main-lobe GPS satellite detection.

If the first satellite $SV_1$ acquired is a main-lobe satellite as designated by its received power being above a certain threshold, the simplification illustrated in FIG. 14 can occur. As shown in FIG. 14, a first satellite acquired with C/No at a level that implies the signal is from a main-lobe antenna pattern (i.e., above a certain signal level, e.g., 35 dB-Hz). It is known that the GPS receiver is constrained to be at the GEO orbit altitude above the equator. Given that the GPS receiver is in the main-lobe beam of the transmitting GPS satellite $SV_2$, the following method 300 can be used to determine an approximate position of the GPS receiving station, shown by regions $R_1$ and $R_2$ in FIG. 14, the approximate position then used to compute an optimized search order and constrained GPS Doppler range for each of the not-yet-acquired GPS satellites.

The method 300 includes the step 302 of acquiring a first satellite $SV_1$ using any technique. The method further includes the step 304 of determining the position vector of the first GPS satellite $SV_1$ using time. The method also includes the step 306 of determining that the satellite $SV_1$ acquired is a main-lobe satellite. The method 300 further includes the step 308 of computing a range of possible locations around the GEO orbit altitude circle that the GPS receiver could be located based on the GPS transmitter mainlobe antenna patterns and the position of the first satellite $SV_1$. The method 300 also includes the step 310 of computing a preferred satellite search order and reduced Doppler search range for each of the GPS satellites not yet acquired based on the range of possible locations and an almanac.

The determination in step 306 is based on received signal power greater than a threshold. The time in step 302 can be determined from demodulating data from the first tracked satellite $SV_1$. Alternately, the time in step 302 can be determined from an approximate time loaded into the GPS receiver at the start, the initial time estimate incremented by the GPS processor software by a pre-determined time on an interrupt time event or based on some other timer. The location and velocity data of the first satellite $SV_1$ can be determined from almanac data or from ephemeris data.

Once the acquisition processor 100 identifies the visible satellites' IDs, traditional GPS tracking channels are assigned to acquire and track the satellites as they are found. The acquisition processor 100 is configurable to search for strong or weak signals dependent on setting of coherent integration period, non-coherent integration period, Doppler frequency and Doppler search step size. The processor 100 can search for multiple satellites simultaneously as long as all satellites searched are at a single Doppler frequency. The search order can be further optimized as satellites are acquired. Satellites that have been acquired cause a re-ordering of the satellite search order list to make it more likely to find subsequent satellites. The method of re-ordering is unique and based on a previously stored GPS satellite almanac.

There are several novel features incorporated into the systems and methods described above. For example, a dedicated flash correlator device 106 is disclosed that tests multiple satellites simultaneously for all possible code phase delays at one unique Doppler frequency for all satellites. Scanning simultaneous satellites for all code phases at one Doppler bin improves upon previous architectures. Additionally, a search order function is disclosed that minimizes the search time for all visible satellites by searching for satellites over those Doppler ranges that satellites are most likely to be. Furthermore, a search order function is disclosed that reduces the search time by reducing the number of satellites to be searched by re-ordering the remaining satellite search list from most-likely to least likely to be found after finding at least one satellite, the re-ordering being dependent on the satellite ID's already found.

Additional novel aspects include the summing of coherent integration data to a plurality of bits over an integer number of milliseconds for every possible half-chip spaced code phase delay. It is then encoded into two bits to minimize the storage requirements and computational circuitry for the flash correlation function. Searching for all satellites at a single Doppler value simplifies on previous architectures that scan for a unique Doppler frequency for each Satellite. Also, using a-priori information about the position of the GPS receiver (at GEO altitudes) to determine possible location of the GPS Receiver with one main-lobe satellite or two satellites, the approximate position then used to compute a constrained satellite and Doppler search range for all GPS satellites not yet acquired. An optimized search method has been disclosed that prioritizes the satellite search order based on the probability of satellites transmitting signals at a range of Dopplers. Said another way, the optimized search method searches the higher probability Doppler range first.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A global positioning system (GPS) signal acquisition processor for use with a GPS receiver, the processor comprising:
   a Doppler removal and resampler module configured to: receive in-phase and quadrature data from a digital down converter, remove Doppler errors from the data, and resample the data;
   a coherent integration module in communication with the Doppler removal and resample module configured to: receive the data and determine a plurality of coherent sums of the resampled in-phase and quadrature data;
   said coherent integration module also configured to: scale a number of bits of the plurality of coherent sums of the resampled in-phase and quadrature data to a lessor number of bits of a plurality of coherent sums;
   a time domain correlation module configured to: receive the lessor number of bits of a plurality of coherent sums and a plurality of bits from a spreading code memory, and produce a plurality of coherent correlation sums, each coherent correlation sum corresponding to a particular code phase delay; and
   a non-coherent integration module in communication with the time domain correlation module configured to: receive the plurality of coherent correlation sums from the time domain correlation module, compute, based on the plurality of coherent correlation sums, a plurality of magnitude-squared sums, and sum the plurality of magnitude squared sums non-coherently to produce a plurality of non-coherent summed data.

2. The processor of claim 1 further comprising a peak detector module in communication with the non-coherent integration module configured to: receive the non-coherent summed data and detect the presence of a satellite signal within the non-coherent summed data.

3. The processor of claim 2 wherein the peak detector module is configured to utilize a peak proximity test to detect the presence of the satellite signal within the non-coherent summed data.

4. The processor of claim 3 wherein the peak detector module is configured to identify the three largest non-coherent sums of the non-coherent summed data and non-coherent memory addresses corresponding to the three largest non-coherent sums being adjacent to one another, wherein the three largest non-coherent sums adjacent to one another indicate the presence of the satellite signal.

5. The processor of claim 1 wherein said Doppler removal and resampler module includes:
a numerically controlled oscillator (NCO) producing sine and cosine signals.

6. The processor of claim 5 wherein said Doppler removal and resampler module includes a single sideband mixer in communication with the NCO configured to: receive the sine and cosine signals from the NCO, and in communication with the digital down converter and configured to: receive in-phase and quadrature signals and output in-phase and quadrature signals.

7. The processor of claim 1 wherein said correlation module includes:
a plurality of multipliers, each multiplier multiplying an in-phase and quadrature sample with one-bit samples and producing an in-phase and quadrature output.

8. The processor of claim 7 wherein said correlation module includes:
a plurality of adders to sum the outputs of the plurality of multipliers to produce a summation.

9. The processor of claim 1, wherein the GPS receiver is in a geosynchronous earth orbit (GEO).

10. The processor of claim 1 wherein the GPS receiver is placed in a low earth orbit (LEO).

11. The processor of claim 1 wherein said coherent integration module is configured to determine the plurality of coherent sums in a coherent integration time period, the coherent integration time period programmable to an integer number of milliseconds.

12. The processor of claim 11, wherein said non-coherent integration module is configured to produce the non-coherent summed data in a non-coherent integration time period, the non-coherent integration time period being programmable to an integer number of coherent integration time periods.

13. The processor of claim 1 wherein the plurality of coherent sums correspond to one sum or more for every half-chip of spreading code phase delay.

14. The processor of claim 1, wherein a non-coherent integration module is configured to produce sequentially sum all code phase delays of a spreading code at greater than or equal to one sum for every half-chip of spreading code phase delay.

15. The processor of claim 1 wherein said Doppler removal and resampler module is configured to operate at a Doppler value, the Doppler value being programmable.

16. The processor of claim 1 wherein the number of bits of the spreading code memory that can be simultaneously processed is greater than one.

17. The processor of claim 1 wherein the number of bits of the spreading code memory that can be simultaneously processed is a function of a clock rate and the number of words of coherent and non-coherent memory.

18. A method of GPS signal acquisition comprising:
receiving in-phase and quadrature data;
removing Doppler errors from the data;
resampling the data;
determining a plurality of coherent sums of the resampled in-phase and quadrature data;
scaling a number of bits of the plurality of coherent sums of the resampled in-phase and quadrature data to a lessor number of bits of a plurality coherent sums;
retrieving a plurality of bits from a spreading code memory; producing a plurality of coherent correlation sums, each coherent correlation sum corresponding to a particular code phase delay;
computing, based on the plurality of coherent correlation sums, a plurality of magnitude-squared sums;
summing the plurality of magnitude squared sums non-coherently to produce non-coherent summed data; and
detecting the presence of a satellite signal within the non-coherent summed data.

19. A method, comprising:
acquiring a signal of a first GPS satellite and a signal of a second GPS satellite;
determining the position and velocity vector of the first and second GPS satellite using time;
computing a measured Doppler difference as the difference of a measured Doppler from the first and second GPS satellite;
computing a predicted Doppler difference model between the first and second GPS satellite when the GPS receiver is constrained to be on a GEO altitude; and
computing an approximate position of the GPS receiver based on the measured Doppler difference minus the predicted Doppler difference model.

20. A method of claim 19, further comprising:
computing the position and velocity vectors of the remaining satellites in the GPS constellation using an almanac and time.

21. A method of claim 20, further comprising:
computing a reduced Doppler search range for each of the GPS satellites not yet acquired based on the computed position and velocity vectors.

22. A method of claim 21, wherein computing a reduced Doppler search range for each of the GPS satellites not yet acquired based on the computed position and velocity vectors, comprises:
computing a preferred satellite search order and reduced Doppler search range for each of the GPS satellites not yet acquired based on the computed position and velocity vectors.

23. A method of claim 22, wherein computing a preferred satellite search order and reduced Doppler search range for each of the GPS satellites not yet acquired based on the computed position and velocity vectors, comprises:
computing a preferred satellite search order and reduced Doppler search range for each of the GPS satellites not yet acquired based on the computed position and velocity vectors,
wherein the computed position vectors comprise both a computed approximate position vector of the GPS receiver and computed position vectors of remaining GPS satellites, and
wherein the computed velocity vectors comprise computed velocity vectors of the remaining GPS satellites.

* * * * *